United States Patent
Large et al.

(10) Patent No.: US 10,048,647 B2
(45) Date of Patent: Aug. 14, 2018

(54) OPTICAL WAVEGUIDE INCLUDING SPATIALLY-VARYING VOLUME HOLOGRAM

(71) Applicant: MICROSOFT TECHNOLOGY LICENSING, LLC, Redmond, WA (US)

(72) Inventors: Timothy Andrew Large, Bellevue, WA (US); John Lutian, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 41 days.

(21) Appl. No.: 14/227,834

(22) Filed: Mar. 27, 2014

(65) Prior Publication Data

US 2015/0277375 A1    Oct. 1, 2015

(51) Int. Cl.
| | |
|---|---|
| G02B 6/10 | (2006.01) |
| G03H 1/02 | (2006.01) |
| G01J 1/42 | (2006.01) |
| G03H 1/26 | (2006.01) |
| F21V 8/00 | (2006.01) |
| G02B 27/00 | (2006.01) |

(52) U.S. Cl.
CPC .......... *G03H 1/0248* (2013.01); *G01J 1/4204* (2013.01); *G02B 6/005* (2013.01); *G02B 6/0058* (2013.01); *G02B 27/0081* (2013.01); *G03H 1/26* (2013.01); *G03H 2001/0216* (2013.01)

(58) Field of Classification Search
None
See application file for complete search history.

(56) References Cited

U.S. PATENT DOCUMENTS

| | | |
|---|---|---|
| 4,012,119 A | 3/1977 | Adams et al. |
| 4,826,300 A | 5/1989 | Efron et al. |
| 5,198,653 A | 3/1993 | Shen et al. |
| 5,331,446 A | 7/1994 | Hirai et al. |
| 5,715,337 A | 2/1998 | Spitzer et al. |
| 5,815,222 A | 9/1998 | Matsuda et al. |

(Continued)

FOREIGN PATENT DOCUMENTS

| | | |
|---|---|---|
| DE | 102012100201 A1 | 9/2012 |
| EP | 2447787 A1 | 5/2012 |

(Continued)

OTHER PUBLICATIONS

ISA European Patent Office, International Search Report and Written Opinion issued in Application No. PCT/US2015/021922, dated Jun. 2, 2015, Netherlands, 10 Pages.

(Continued)

*Primary Examiner* — Chris Chu
(74) *Attorney, Agent, or Firm* — Alleman Hall Creasman & Tuttle LLP

(57) ABSTRACT

An optical waveguide includes a waveguide body and a spatially-varying volume hologram. The volume hologram increases, in a coordinate direction along the volume hologram, an angle of incidence by which light propagating in the waveguide body via total internal reflection is released from the waveguide body. The optical waveguide may form part of an optical system that includes one or more light sources and/or optical sensors.

11 Claims, 4 Drawing Sheets

(56) References Cited

U.S. PATENT DOCUMENTS

| | | | |
|---|---|---|---|
| 5,907,416 | A | 5/1999 | Hegg et al. |
| 6,043,910 | A | 3/2000 | Slinger |
| 6,075,512 | A | 6/2000 | Patel et al. |
| 6,404,538 | B1 | 6/2002 | Chen et al. |
| 6,480,307 | B1 | 11/2002 | Yang |
| 6,512,560 | B2 | 1/2003 | Ohtake et al. |
| 6,512,566 | B1 | 1/2003 | Yamagishi et al. |
| 6,690,447 | B1 | 2/2004 | Stephenson et al. |
| 6,760,135 | B1 | 7/2004 | Payne et al. |
| 7,068,910 | B2 | 6/2006 | Duine et al. |
| 7,253,799 | B2 | 8/2007 | Lee et al. |
| 7,845,841 | B2 | 12/2010 | Sampsell |
| 7,876,405 | B2 | 1/2011 | Ito et al. |
| 7,976,208 | B2 | 7/2011 | Travis |
| 8,218,211 | B2 | 7/2012 | Kroll et al. |
| 8,233,204 | B1 | 7/2012 | Robbins et al. |
| 8,477,425 | B2 | 7/2013 | Border et al. |
| 8,487,980 | B2 | 7/2013 | Kroll et al. |
| 8,547,615 | B2 | 10/2013 | Leister |
| 8,553,302 | B2 | 10/2013 | Leister |
| 8,625,183 | B2 | 1/2014 | Khan |
| 8,698,705 | B2 | 4/2014 | Burke |
| 8,810,913 | B2 | 8/2014 | Simmonds et al. |
| 9,122,244 | B2 | 9/2015 | Lee et al. |
| 9,179,841 | B2 | 11/2015 | Kim |
| 9,232,172 | B2 | 1/2016 | Perkins et al. |
| 9,256,007 | B2 | 2/2016 | Vasylyev |
| 9,335,604 | B2 | 5/2016 | Popovich et al. |
| 9,341,846 | B2 | 5/2016 | Popovich et al. |
| 9,406,166 | B2 | 8/2016 | Futterer |
| 2003/0067760 | A1 | 4/2003 | Jagt et al. |
| 2004/0108971 | A1 | 6/2004 | Waldern et al. |
| 2004/0227703 | A1 | 11/2004 | Lamvik et al. |
| 2005/0243258 | A1 | 11/2005 | Oh |
| 2006/0028400 | A1 | 2/2006 | Lapstun et al. |
| 2007/0019264 | A1 | 1/2007 | Tanijiri et al. |
| 2008/0049450 | A1* | 2/2008 | Sampsell ............ G02B 6/0048 362/619 |
| 2009/0244415 | A1 | 10/2009 | Ide |
| 2010/0027289 | A1 | 2/2010 | Aiki et al. |
| 2010/0053771 | A1 | 3/2010 | Travis et al. |
| 2010/0056274 | A1 | 3/2010 | Uusitalo et al. |
| 2010/0073744 | A1 | 3/2010 | Zschau et al. |
| 2010/0103485 | A1 | 4/2010 | Haussler |
| 2010/0149073 | A1 | 6/2010 | Chaum et al. |
| 2010/0157399 | A1 | 6/2010 | Kroll et al. |
| 2010/0186818 | A1* | 7/2010 | Okorogu ............ H01L 31/0547 136/259 |
| 2012/0013988 | A1 | 1/2012 | Hutchin |
| 2012/0062850 | A1 | 3/2012 | Travis |
| 2012/0105310 | A1 | 5/2012 | Sverdrup et al. |
| 2012/0105765 | A1 | 5/2012 | Kawai et al. |
| 2012/0120467 | A1 | 5/2012 | Gruhlke et al. |
| 2012/0188791 | A1 | 7/2012 | Voloschenko et al. |
| 2013/0022222 | A1 | 1/2013 | Zschau et al. |
| 2013/0050186 | A1 | 2/2013 | Large et al. |
| 2013/0051730 | A1 | 2/2013 | Travers et al. |
| 2013/0181888 | A1 | 7/2013 | Kuriya et al. |
| 2013/0201094 | A1 | 8/2013 | Travis et al. |
| 2013/0202297 | A1 | 8/2013 | Martinelli et al. |
| 2013/0222384 | A1 | 8/2013 | Futterer |
| 2013/0329301 | A1 | 12/2013 | Travis |
| 2014/0033052 | A1 | 1/2014 | Kaufman et al. |
| 2014/0063054 | A1 | 3/2014 | Osterhout et al. |
| 2014/0104618 | A1 | 4/2014 | Potsaid et al. |
| 2014/0104664 | A1 | 4/2014 | Lee et al. |
| 2014/0104665 | A1 | 4/2014 | Popovich et al. |
| 2014/0140653 | A1 | 5/2014 | Brown et al. |
| 2014/0140654 | A1 | 5/2014 | Brown et al. |
| 2014/0146394 | A1 | 5/2014 | Tout et al. |
| 2014/0168735 | A1 | 6/2014 | Yuan et al. |
| 2015/0016777 | A1 | 1/2015 | Abovitz et al. |
| 2015/0036199 | A1 | 2/2015 | Leister et al. |
| 2015/0085331 | A1 | 3/2015 | Chae |
| 2015/0235448 | A1 | 8/2015 | Schowengerdt |
| 2015/0277123 | A1 | 10/2015 | Chaum et al. |
| 2015/0277375 | A1 | 10/2015 | Large et al. |
| 2015/0378080 | A1 | 12/2015 | Georgiou et al. |
| 2016/0041393 | A1 | 2/2016 | Inagaki |
| 2016/0077338 | A1 | 3/2016 | Robbins et al. |
| 2016/0077339 | A1 | 3/2016 | Christmas et al. |
| 2016/0139402 | A1 | 5/2016 | Lapstun |
| 2016/0170372 | A1 | 6/2016 | Smithwick |
| 2016/0195720 | A1 | 7/2016 | Travis et al. |
| 2016/0379606 | A1 | 12/2016 | Kollin et al. |
| 2017/0078652 | A1 | 3/2017 | Hua et al. |

FOREIGN PATENT DOCUMENTS

| | | |
|---|---|---|
| GB | 2260203 A | 4/1993 |
| GB | 2461294 A | 12/2009 |
| GB | 2501754 A | 11/2013 |
| WO | 9735223 A1 | 9/1997 |
| WO | 9821612 A1 | 5/1998 |
| WO | 0172037 A1 | 9/2001 |
| WO | 03013151 A2 | 2/2003 |
| WO | 2008046057 A2 | 4/2008 |
| WO | 2008049917 A1 | 5/2008 |
| WO | 2008155563 A1 | 12/2008 |
| WO | 2012088478 A1 | 6/2012 |
| WO | 2012103559 A1 | 8/2012 |
| WO | 2013028687 A2 | 2/2013 |
| WO | 2014085734 A1 | 6/2014 |
| WO | 2014151877 A1 | 9/2014 |
| WO | 2014167290 A1 | 10/2014 |
| WO | 2015032828 A1 | 3/2015 |
| WO | 2016105285 A1 | 6/2016 |

OTHER PUBLICATIONS

"Stacked Flat Type Light Guide Panel", Tech Briefs, Available at: http://www.techbriefs.com/component/content/article/14337, May 1, 2011, 4 pages.

Travis, A., "Holographic Display" U.S. Appl. No. 14/921,864, filed Oct. 23, 2015, 38 pages.

Guenter, B. et al., "Foveated 3D Graphics", ACM Transactions on Graphics (TOG) 31, No. 6, Nov. 20, 2012, 10 pages.

ISA European Patent Office, International Search Report and Written Opinion Issued in PCT Application No. PCT/US2017/019231, dated May 26, 2017, WIPO, 14 pages.

Huebschman, M. et al., "Dynamic holographic 3-D image projection", Optics Express, vol. 11, No. 5, Mar. 10, 2003, 9 pages.

Serati, S. et al., "Advances in liquid crystal based devices for wavefront control and beamsteering", In Proceedings of Optics and Photonics 2005, Aug. 18, 2005, San Diego, CA, USA, 14 pages.

"100% Fill Factor White Paper", Boulder Nonlinear Systems, Inc., Available Online at http://www.auniontech.com/uploadfile/2014/01/100%20Fill%20Factor%20White%20Paper.pdf, Jan. 2008, 2 Pages.

Oh, C. et al., "Achromatic diffraction from polarization gratings with high efficiency", Optics Letters, vol. 33, No. 20, Oct. 15, 2008, 3 pages.

Zschau, E. et al., "Generation, encoding and presentation of content on holographic displays in real time", Three-Dimensional Imaging, Visualization, and Display 2010, vol. 7690. Apr. 2010, 14 pages.

Reichelt, S. et al., "Holographic 3-D Displays—Electro-holography within the Grasp of Commercialization", Advances in Lasers and Electro Optics, Apr. 2010, 29 pages.

Yaras, F. et al., "State of the Art in Holographic Displays: A Survey", Journal of Display Technology, vol. 6, No. 10, Oct. 2010, 12 pages.

Nahar, N. et al., "Efficient Free-Space Coupling to LMA-PCF by Aberration Correction", IEEE Transactions on Components, Packaging, and Manufacturing Technology, Oct. 2011, 6 pages.

Palima, D. et al., "Wave-guided optical waveguides", Optics Express, vol. 20, No. 3, Jan. 30, 2012, 11 pages.

SBGLab's channel, "SBG Labs Holographic Eye Adaptive Display", YouTube Website, Available Online at https://www.youtube.com/watch?v=XkmqKeGn4yo, Mar. 11, 2012, 1 page.

(56) References Cited

OTHER PUBLICATIONS

Kessler, D., "Optics of Near to Eye Displays (NEDs)", Kessler Optics & Photonics Solutions, Ltd., Feb. 19, 2013, 37 pages.
Kress, B. et al. "A review of head-mounted displays (HMD) technologies and applications for consumer electronics", Photonic Applications for Aerospace, Commercial, and Harsh Environments IV, Proc. SPIE vol. 8720, May 31, 2013, 13 pages.
Mirza, K. et al., "Key Challenges to Affordable See Through Wearable Displays: The Missing Link for Mobile AR Mass Deployment" Optinvent Website, Retrieved Online at http://www.optinvent.com/HUD-HMD-benchmark, Available as Early as Jun. 13, 2013, 8 pages.
Lanman, D. et al., "Near-Eye Light Field Displays", In Proceedings of ACM SIGGRAPH 2013 Emerging Technologies, Jul. 21, 2013, Anaheim, CA, USA, 10 pages.
Chuan, S. et al., "Holographic projection using converging spherical wave illumination", In Proceedings of the 2013 Seventh International Conference on Image and Graphics, Jul. 26, 2013, Qingdao, China, 5 pages.
Goetz, G. A. et al., "Holographic display system for restoration of sight to the blind", Journal of Neural Engineering 10, No. 5, Oct. 2013, 23 pages.
"Composyt Light Labs", Retrieved Online at http://composyt.com/, Available as Early as Jan. 2, 2014, 1 page.
Bleha, W. et al., "Binocular Holographic Waveguide Visor Display", SID Symposium Digest of Technical Papers, vol. 45, No. 1, Jun. 1, 2014, 4 pages.
"Spatial Light Modulators—XY Series", Boulder Nonlinear Systems, Inc., Retrieved Online at http://bnonlinear.com/pdf/XYseriesDS0909.pdf, Available as Early as Jul. 20, 2014, 12 pages.
Zhang, Z. et al., "Fundamentals of phase-only liquid crystal on silicon (LCOS) devices", Light: Science & Applications (2014) 3, Oct. 24, 2014, 10 pages.
Travis, A. et al., U.S. Appl. No. 14/589,513, "Virtual Image Display with Curved Light Path", filed Jan. 5, 2015, 32 pages.
Burt, J., "Intel Buys Smart Eyewear Maker Composyt", eWeek Website, Available Online at http://www.eweek.com/blogs/first-read/intel-buys-smart-eyewear-maker-composyt, Jan. 21, 2015, 4 pages.
Laing, R., "Glass, what Glass? Intel snaps up Swiss eyewear startup", ZDNet Website, Available Online at http://www.zdnet.com/article/glass-what-glass-intel-snaps-up-swiss-eyewear-startup/, Jan. 21, 2015, 4 pages.
Kollin, J. et al., U.S. Appl. No. 14/754,451, "Holographic Near-Eye Display" filed Jun. 29, 2015, 42 pages.
Yeom, H. et al., "Design of holographic Head Mounted Display using Holographic Optical Element", Lasers and Electro-Optics Pacific Rim (CLEO-PR), vol. 3, Aug. 24, 2015, 10 pages.
Willekens, O. et al., "Paper No. S1.3: Lead Zirconate Titanate-Based Transmissive Liquid Crystal Lens Approach", SID Symposium Digest of Technical Papers, vol. 46, Iss. S1, Sep. 22, 2015, 1 page.
Luminit, "Lunar EVA Holographic Display (LEVAD)", Research & Development for NASA, Available Online at http://luminitrd.com/NASA.html, Available as Early as Oct. 12, 2015, 4 pages.
Qu, W. et al., "Image magnification in lensless holographic projection using double-sampling Fresnel diffraction", Journal of Applied Optics, vol. 54, Iss. 34, Dec. 1, 2015, 4 pages.
Yeom, H. et al., "3D holographic head mounted display using holographic optical elements with astigmatism aberration compensation", Optics Express 32025, vol. 23, No. 25, Dec. 3, 2015, 10 pages.
ISA European Patent Office, International Search Report and Written Opinion Issued in PCT Application No. PCT/US2015/068208, May 17, 2016, WIPO, 13 pages.
Li, G. et al., "Holographic display for see-through augmented reality using mirror-lens holographic optical element", Optics Letters, vol. 41, No. 11, Article Published May 20, 2016, Journal Published Jun. 1, 2016, 4 pages.
Khorasaninejad, M. et al., "Metalenses at visible wavelengths: Diffraction-limited focusing and subwavelength resolution imaging", Science, vol. 352, Iss. 6290, Jun. 3, 2016, 6 pages.
Kaczorowski, A. et al., "Adaptive, spatially-varying aberration correction for real-time holographic projectors", Optics Express 15742, vol. 24, No. 14, Article Published Jul. 5, 2016, 15 pages.
Pascotta, R., "Volume Bragg Gratings" Encyclopedia of Laser Physics and Technology, vol. 1, Jul. 31, 2016, 3 pages.
Robbins, S. et al., U.S. Appl. No. 15/268,269, "Holographic Wide Field of View Display", filed Sep. 16, 2016, 40 pages.
Lee, S. et al., "See-through Light Field Displays for Augmented Reality", In Proceedings of SIGGRAPH ASIA 2016 Virtual Reality meets Physical Reality: Modelling and Simulating Virtual Humans and Environments, Dec. 5, 2016, Macau, 2 pages.
ISA European Patent Office, International Search Report and Written Opinion Issued in PCT Application No. PCT/US2016/039142, dated Dec. 9, 2016, WIPO, 17 pages.
IPEA European Patent Office, Second Written Opinion Issued in PCT Application No. PCT/US2015/068208, dated Dec. 14, 2016, WIPO, 4 pages.
IPEA European Patent Office, International Preliminary Report on Patentability Issued in PCT Application No. PCT/US2015/068208, dated Mar. 22, 2017, WIPO, 7 pages.
IPEA European Patent Office, Second Written Opinion Issued in PCT Application No. PCT/US2016/039142, dated Mar. 31, 2017, WIPO, 7 pages.

\* cited by examiner

OPTICAL WAVEGUIDE INCLUDING SPATIALLY-VARYING VOLUME HOLOGRAM

BACKGROUND

Optical waveguides may be used to guide electromagnetic radiation (EMR), such as visible light, infrared, microwaves, or other suitable wavelengths via total internal reflection. Optical waveguides may take a variety of forms and may be used within a diverse range of optical systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an embodiment, an optical waveguide includes a waveguide body and a spatially-varying volume hologram. The volume hologram increases, in a coordinate direction along the volume hologram, an angle of incidence by which light propagating within the waveguide body via total internal reflection is released from the waveguide body. The optical waveguide may form part of an optical system that includes one or more light sources and/or optical sensors.

DETAILED DESCRIPTION

As computing devices, graphical displays, imaging devices, and other electronic devices become smaller, the need increases for smaller optical components. Reduction in the size of electronic devices continues to trend in the direction of thinner or flatter device form-factors, which may in turn dictate the size and/or shape of optical components as measured, for example, relative to the thinnest dimension of the device.

One potential solution for reducing the size of an optical system includes what may be referred to as a wedge imager. A wedge imager may include a plastic, wedge-shaped component that allows the optical system to be flattened. However there may be limitations on design and manufacturability of these wedge-shaped components that restrict or overly limit their use. Furthermore, the wedge-shaped component typically requires a matching, air spaced turning film. The turning structure of this turning film may cause undesirable performance compromises. The disclosed optical waveguide does not necessarily require a turning film or a minimum air space, thereby potentially overcoming one or more of the disadvantages associated with the previously described wedge imager.

In at least one example, a flat-panel optical system is disclosed that includes an optical waveguide. The optical waveguide includes an optically transparent waveguide body in combination with a light-interaction layer containing a spatially-varying volume hologram. The flat-panel optical system may form a component of an imaging device or a display device.

In the case of a display device or display implementation, the volume hologram may, for example, be configured to function as an angle filter, which ejects out of the waveguide light of a given angle propagating by total internal reflection within the waveguide. A fringe spacing and angle of gratings defining the volume hologram may vary along at least one coordinate direction of the waveguide such that a continuous image to be displayed, encoded by the injection angle of light at a corner or edge of the waveguide, is released from a face of the waveguide.

In the case of an imaging device or imaging implementation (e.g., camera), ambient light defining a continuous image to be captured is received through a face of the waveguide, and the volume hologram redirects the light at angles that propagate the light via total internal reflection within the waveguide toward one or more optical sensors near an edge or corner of the waveguide. A fringe spacing and angle of gratings defining the volume hologram may vary along at least one coordinate direction of the waveguide such that a continuous image to be captured, encoded as points of reception on a face of the waveguide, is received by the optical sensor at point or area of release of the waveguide.

Figure 1:
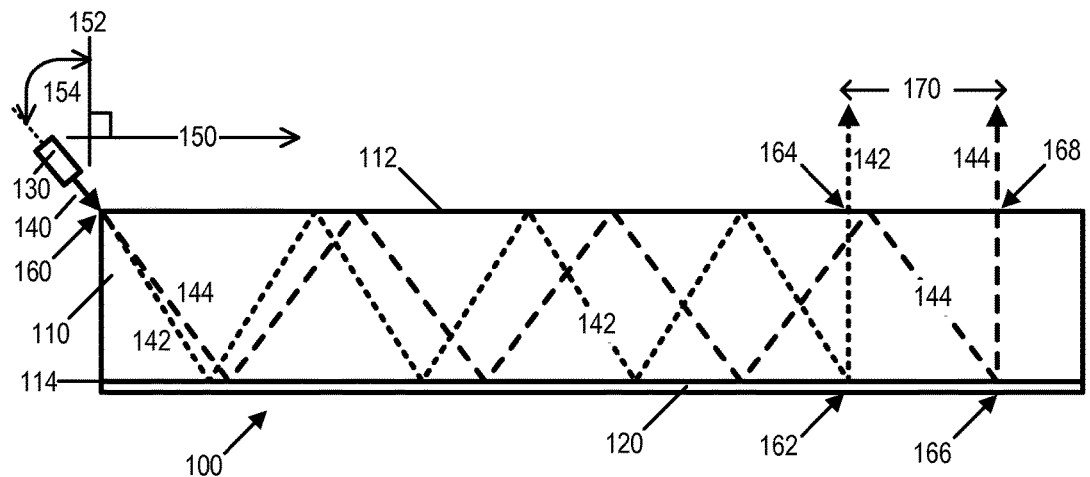
FIG. 1 is a schematic diagram depicting an example optical waveguide.

FIG. 1 is a schematic diagram depicting an example optical waveguide 100. Optical waveguide 100 includes a waveguide body 110 and a light-interaction layer 120. Waveguide body 110 may be formed from an optically transparent material, such as a glass or polymer, as non-limiting examples. However, waveguide body 110 may be formed from other suitable materials compatible with total internal reflection and volume holograms.

Layer 120 interfaces with and covers at least a portion of waveguide body 110. In the example of FIG. 1, layer 120 interfaces with and covers surface 114 defining a face of waveguide body 110. However, in other examples, the disclosed light-interaction layer may interface with and cover only a portion of an individual face or surface of a waveguide body that is less than the entirety of that face or surface.

Layer 120 may include or contain a volume hologram. A volume hologram includes numerous features, such as gratings, that reflect, diffract, and/or refract light. As an example, a volume hologram may include or contain a collection of features referred to as Bragg gratings. Bragg gratings may differ with respect to angle (e.g., different angles relative to a reference axis) and/or spacing along one or more coordinate directions of the volume hologram. Each Bragg grating is excitable by light of a narrow wavelength range and a narrow range of incidence angles. A collection of Bragg gratings may, for example, include a series of high and low refractive index planes that have high angular and wavelength selectivity, depending on depth and the magnitude of the refractive index difference.

Excitation wavelengths and incidence angles may be defined by or may be based upon the characteristics of light used to record the hologram. Such characteristics may include, for example, the wavelength and spatial orientation of light applied to the holographic recording medium. Outside the excitation wavelength band or range of incidence angles, the Bragg grating is optically transparent—a condition that allows numerous Bragg gratings to occupy the same or adjacent volume holograms, and to operate independently of each other. Further, multiple Bragg gratings may be recorded over one another in the same medium (e.g., for multiple colors). Other suitable types of volume holograms may be used as an alternative to or in addition to Bragg gratings. Furthermore, the volume hologram may itself be a hologram of an actual object—such that that actual object will be visible when the volume hologram is viewed.

Wavelength selectivity of Bragg gratings may correspond to angle selectivity. For a Bragg reflector the wavelength selectivity $\Delta\lambda$ is approximately $\Delta\lambda = \lambda^2/(2 \cdot n \cdot L)$, where n is the index of the medium and L the length of the grating. In a non-limiting example of a volume hologram, L=10 microns, n=1.5, and $\lambda$=550 nanometers resulting in a wavelength selectivity of $\Delta\lambda$=10 nanometers.

Accordingly, a volume hologram may be configured, when excited, to redirect at least a portion of the light in a direction that differs from the total internal reflection angle of incidence of that propagating light. The angle and direction at which the light is redirected and the portion of light that is redirected may be selected based on the manner by which the hologram is recorded.

The term "volume hologram" may be used herein to describe a hologram having a thickness (e.g., as measured along axis 152) that is substantially greater than (e.g., at least a multiple of) a wavelength of light used to record that hologram and/or a wavelength of light that excites features contained within that hologram. For example, a thickness of a volume hologram may be ten microns to one-hundred microns. However, other suitable thicknesses may be used.

FIG. 1 further depicts an example light source 130 injecting light 140 into waveguide body 110 at an angle of injection 154 and at an area of injection 160. Light source 130 may be any suitable light source, such as a projection engine, for example. In the example of FIG. 1, angle of injection 154 is measured relative to an axis 152 that is orthogonal to coordinate direction 150.

Light 140 may take the form of a diverging beam of light having a width dimension in the reference plane of FIG. 1—e.g., a plane containing an axis of coordinate direction 150 and axis 152. This width dimension of light 140 is depicted in FIG. 1 by example light paths 142 and 144. Angle of injection 154 for light 140 may correspond to a centerline or average angle between an angle of injection of light path 142 and an angle of injection of light path 144 within the reference plane. Within three-dimensional space, the angle of injection may refer to the centerline of a light cone or light beam of another suitable shape.

Light 140 propagates within at least a portion of waveguide body 110 along coordinate direction 150 via total internal reflection between surface 112 and one or more opposing surfaces which may include surface 114 of the waveguide body and/or one or more features of the volume hologram of layer 120. For example, if a material forming waveguide body 110 and light-interaction layer 120 are optically identical or optically similar, propagating light may pass through an interface between the waveguide body and the light-interaction layer where the light may be reflected from one or more features of the volume hologram.

As one example, light traveling along light path 142 propagates within waveguide body 110 via total internal reflection from injection of the light into the waveguide body at an area of injection 160 until reaching a position 162. Light traveling along light path 142 interacts with features of the volume hologram of layer 120 at position 162 resulting in redirection of the light toward a position 164 from which the light is released from waveguide body 110 along light path 142.

The redirection of light traveling along light path 142 at position 162 may include reflection of the light at an angle of reflection that is less than the critical angle that releases the light incident upon an interface of surface 112 from waveguide body 110 by way of refraction, as indicated at position 164. In another configuration, however, a volume hologram of layer 120 may refract or diffract light through the volume hologram, thereby releasing the diffracted light from an opposing side of the waveguide body containing surface 114 that opposes surface 112. Further aspects of volume holograms will be described with reference to FIG. 2.

As another example, light traveling along light path 144, in contrast to light path 142, propagates within waveguide body 110 via total internal reflection from injection of the light into the waveguide body at area of injection 160 until reaching position 166. In this example, position 166 is located at a farther distance along the waveguide body than position 162 as measured along coordinate direction 150. Light traveling along light path 144 interacts with features of the volume hologram of layer 120 at position 166 resulting in redirection of the light toward a position 168 from which the light is released from waveguide body 110 along light path 144.

The redirection of light traveling along light path 144 at position 166 may include reflection of the light at an angle of reflection that is less than the critical angle that releases the light incident upon an interface of surface 112 from waveguide body 110 by way of refraction as indicated at 168. The angle by which light is released from the surface of the waveguide body may be defined, at least in part, by the characteristics of the light used to record the volume hologram, as will be described in greater detail with reference to FIG. 4.

As further depicted in FIG. 1, the position at which light traveling along light path 142 is released from the waveguide differs from the position at which light traveling along light path 144 is released from the waveguide as a result of the angle-selectivity of the spatially-varying features of the volume hologram. These spatially-varying features may include varying orientation and/or spacing of gratings along the coordinate direction over at least a portion of the volume hologram. The difference in the position of the released light along coordinate direction 150 is depicted by reference numeral 170, and corresponds to the difference in injection angle between light path 142 and 144.

In an example, a spatially-varying volume hologram of layer 120 may continuously map an angle of injection of light into the waveguide body to a position from which the light is released from the waveguide body. In the example depicted in FIG. 1, reference numeral 170 indicates a region of waveguide body 110 along coordinate direction 150 from which light 140 is released across a range of injection angles that vary continuously between the angle of injection of light path 142 and the angle of injection of light path 144. Hence, the point of release of a ray of light with region 170 may be selected by injecting that ray of light into the waveguide body at a corresponding angle. This continuous mapping may be achieved by continuously varying a grating orientation (e.g., an angle relative to a light injection angle or other suitable reference) and/or a grating spacing along coordinate direction 150.

Figure 5:
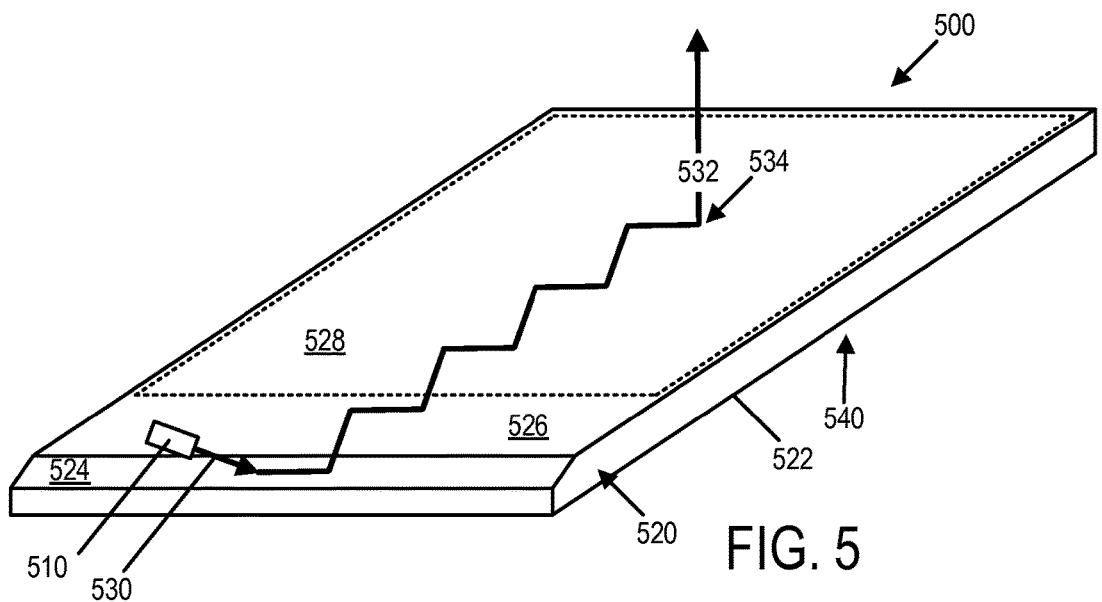
FIGS. 5-7 are schematic diagrams depicting example optical systems.
Figure 6:
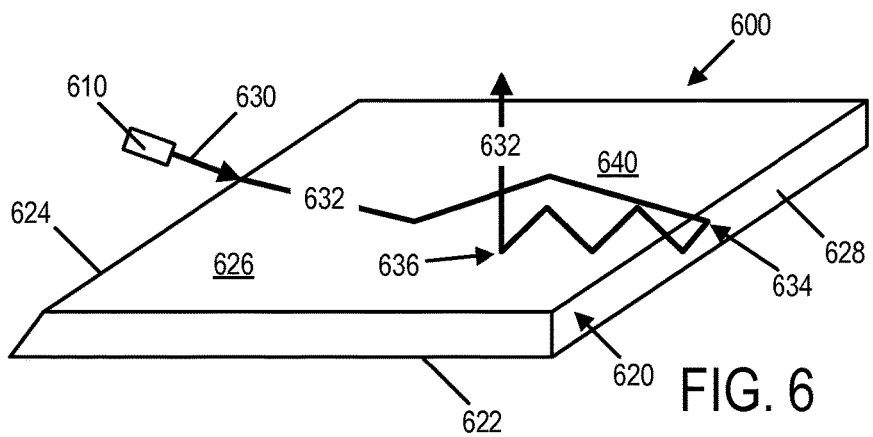
Figure 7:
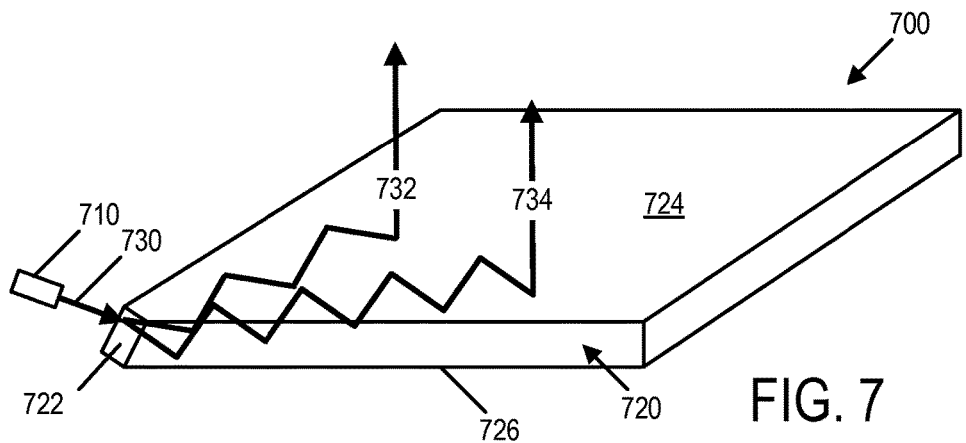

While FIG. 1 depicts a difference in the position of the release of light 140 in coordinate direction 150 due to differences in the injection angle of that light, it will be appreciated that differences in the position of release of light may be achieved in other coordinate directions, including coordinate directions that are orthogonal to the reference plane of FIG. 1, for example. Non-limiting examples of multi-dimensional spatially-varying volume holograms are depicted in FIGS. 5-7.

FIG. 1 depicts an example in which coordinate direction 150 corresponds to the direction of light propagation within the waveguide body for light injected into an edge or corner of the waveguide body at an angle relative to coordinate direction 150. This configuration may be utilized in the context of a display device that provides a display region defined, for example, by reference numeral 170 along coordinate direction 150.

For imaging implementations, coordinate direction 150 may be the same as depicted in FIG. 1, but the direction of light propagation may be opposite what is depicted. In other words, the coordinate direction 150 is opposite or opposing a direction of light propagation within the waveguide body for internally reflected ambient light received through a surface of the waveguide body (e.g., at reference number 170). In such case, light source 130 may alternatively or additionally refer to an optical sensor that captures ambient light received by the waveguide body, such as through the region indicated by reference numeral 170. Here, light paths 142 and 144 may be traced in an opposite direction from the direction depicted in FIG. 1 from outside the waveguide body, toward an optical sensor for detecting the ambient light.

A waveguide body may take the form of any suitably shaped three-dimensional volume of optically transparent material. For example, a waveguide body may take the form of a multi-sided volume having a width, length, and height dimension as measured along three orthogonal coordinate axes. As a non-limiting example, a waveguide body may be substantially longer or larger in two coordinate directions (e.g., length and width), and substantially thinner or flatter in a third coordinate direction (e.g., height). The waveguide body may take the form of a flat plate (e.g., having an aspect ratio of 50:1 or other suitable ratio), for example. Within the context of FIG. 1, a height dimension may correspond to axis 152, and a width or length dimension may correspond to an axis of coordinate direction 150. Non-limiting examples of optical waveguides including a waveguide body and a light-interaction layer are depicted in FIGS. 5-7 with respect to relatively flat, planar waveguides.

As a non-limiting example, waveguide body 110 may have a length of 100 mm (e.g., as measured along an axis of coordinate direction 150) and a thickness of 2 mm (e.g., as measured along axis 152). Layer 120 may have a thickness of 20 microns (e.g., as measured along axis 152) that includes or contains Bragg gratings having a refractive index difference of 0.02. This example results in a reflection characteristic that is relatively narrow, having a 2 degree full width half maximum.

As depicted in FIG. 1, a waveguide body may have a front face defined by surface 112 and a rear face defined by surface 114 that opposes the front face. FIG. 1 depicts an example in which a front face is parallel to a rear face of the waveguide body. In other examples, a front face and a rear face of a waveguide body may be tapered (e.g., converge and/or diverge) relative to one another.

In one example, both a front face and a rear face opposing the front face of a waveguide body may be planar. Planar faces may be parallel to each other or may taper (e.g., converge and/or diverge) relative to each other in one or more coordinate directions. In another example, both a front face and a rear face opposing the front face of a waveguide body may be curved in one or more coordinate directions. Curved faces may be parallel to each other or may taper (e.g., converge and/or diverge) relative to each other. In yet another example, one of a front face or a rear face opposing the front face may be planar and the other of the front face or rear face may be curved. In such case, the front face and the rear face taper (e.g., diverge and/or converge) relative to each other.

In at least some implementations, a volume hologram may form a layer on a rear face of a waveguide body (e.g., surface 114 of waveguide body 110) and light may be released through an opposing front face (e.g., surface 112 of waveguide body 110). In such case, light interaction with the volume hologram may take the form of a redirected reflection of light. In other implementations, a volume hologram may form a layer on a front face of a waveguide body (e.g., surface 112 of waveguide body 110) and light may be released through the front face and that layer of the waveguide. In such case, light interaction with the volume hologram may take the form of a redirected diffraction and/or refraction of light. Within the context of a display device, the front face may correspond to a surface of a waveguide from which light is released from the display device. Within the context of an imaging device, the front face may correspond to a surface of a waveguide through which light is received by the imaging device.

In still other implementations, a volume hologram may be embedded inside the waveguide. Such an arrangement may be mechanically advantageous because the photopolymer (or other recording medium) used to record the volume hologram may be relatively fragile. For example, the surface of BAYFOL photopolymer can be easily damaged.

While not depicted in FIG. 1, a surface or face through which a light source injects light into the waveguide body or through which an optical sensor receives light from the waveguide body may be oriented normal to the angle of injection or reception of such light, as measured from a centerline of the diverging or converging light beam. FIGS. 5-7 depict example optical waveguides that include surfaces or faces of a waveguide body that are normal to the light injection or reception angle.

Dimensions, proportions, and instances of reflection of light within the figures may be, at times, exaggerated or understated for purposes of illustration. For example, FIG. 1 depicts seven instances of reflection for light paths 142 and 144. However, it will be understood that light may be propagated any suitable distance within a waveguide body by any suitable quantity of reflections. It will also be appreciated that the quantity of total internal reflections within a waveguide body may be based on a number of factors, including the shape and size of the waveguide body, an angle of injection of light into the waveguide body, a physical property of the injected light (e.g., wavelength), and the type of interaction that is induced by the light-interaction layer or other material boundaries within which the light propagates.

Figure 2:
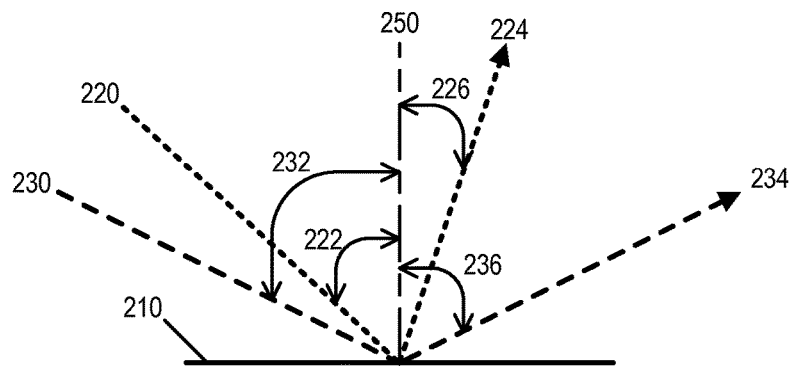
FIG. 2 is a schematic diagram comparing an angle of incidence for two example light rays.

FIG. 2 is a schematic diagram comparing an angle of incidence for two example light rays 220 and 230. As one example, light ray 220 may correspond to light traveling along previously described light path 142, and light ray 230 may correspond to light traveling along previously described light path 144 of FIG. 1.

In FIG. 2, an example light ray 220 is incident upon interface 210 at incidence angle 222 as measured relative to a reference line 250 that is orthogonal to interface 210 at the point of incidence. Interface 210 may include or take the form of a medium boundary, a volume hologram, or a medium boundary in combination with a volume hologram. For example, a volume hologram of interface 210 may include features such as Bragg gratings that are excitable by incident light that is within a limited range of incidence angles and/or wavelengths to provide an interface that exhibits angular selectivity and/or wavelength selectivity.

Light ray 220 incident upon interface 210 at incidence angle 222 may interact with interface 210 by reflecting from interface 210, for example, as reflected light ray 224 having a reflection angle 226. In this example, incidence angle 222 is within an excitation range of incidence angles of a hologram that forms part of interface 210. Because incidence angle 222 is within an angular selectivity range of the hologram, the incident light ray is reflected at reflection angle 226 that differs from (e.g., is less than) incidence angle 222.

For example, light ray 220 may correspond to a portion of previously described light path 142 of FIG. 1 propagating by total internal reflection between the injection of light into the waveguide body at area of injection 160 until reaching position 162. Here, angle 222 for incident light ray 220 corresponds to a total internal reflection angle that is greater than the critical angle for refracting light out of the waveguide body. Reflected light ray 224 may correspond to another portion of light path 142 of FIG. 1 reflected at position 162, and released from the waveguide body at position 164. Here, reflection angle 226 of reflected light ray 224 is less than the total internal reflection angle, and may also be less than the critical angle necessary to release reflected light ray 224 from a material through which it is propagating, such as a waveguide.

Also in FIG. 2, light ray 230 is incident upon interface 210 at incidence angle 232 as measured relative to reference line 250 that is orthogonal to interface 210 at the point of incidence. In this example, incidence angle 232 of light ray 230 does not excite a hologram that forms part of interface 210. For example, incidence angle 232 is greater than angle 222 of light ray 220 and may be outside of the excitation range of incidence angles for the hologram.

Light ray 230 incident upon interface 210 is reflected from interface 210 as reflected light ray 234 having a reflection angle 236, for example. Reflection angle 236 of reflected light ray 234 may be equal to incidence angle 232 of incident light ray 230. In such case, reflection angle 236 of reflected light ray 234 may be equal to an angle of total internal reflection within a waveguide. Because incidence angle 232 is outside of the narrow excitation range of incidence angles provided by interface 210, reflected light ray 234 may continue propagating within the waveguide body by total internal reflection. Light ray 230 may, for example, correspond to a portion of previously described light path 144 of FIG. 1 propagating by total internal reflection between injection of the light into the waveguide body at area of injection 160 until reaching position 166. Hence, FIG. 2 depicts at least one example where two light rays, incident upon an interface at different angles, have different reflective interactions with that interface.

FIG. 2 also depicts an example of how light rays may interact with a volume hologram of interface 210 as a factor of wavelength. As one example, incident light rays 220 and 230 may have different wavelengths relative to each other, resulting in the different reflections of reflected light rays 224 and 234, respectively. Here, light ray 220 may have a wavelength that is within an excitation range of a volume hologram of interface 210, while light ray 230 may have a wavelength that is outside of the excitation range of the volume hologram.

In another example, incident light ray 220 may interact with interface 210 by refracting (in the case of a material boundary), or diffracting or refracting (in the case of a volume hologram) at any suitable refraction or diffraction angle. In such case, the refracted or diffracted light ray would pass through interface 210 rather than being reflected from interface 210 as previously described with reference to reflected light ray 224. As one example, incident light ray 220 having incident angle 222 may be within the angular and/or wavelength selectivity range of a hologram of interface 210 at the point of incidence. Here, light ray 220 may interact with interface 210 by refracting or diffracting through interface 210 as compared to previously described reflected light ray 224 depending, for example, on the orientation and/or spacing of Bragg gratings of the hologram.

Figure 3:
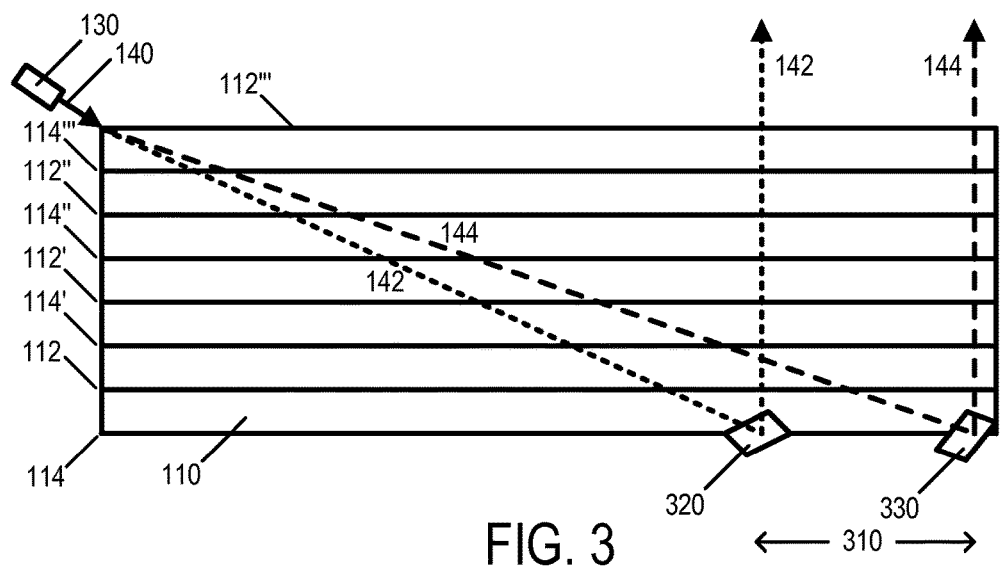
FIG. 3 is a schematic diagram depicting an example unfolded optical path of the example optical waveguide of FIG. 1.

FIG. 3 is a schematic diagram depicting an unfolded optical waveguide 100 of FIG. 1. In FIG. 3, a parallel sided, planar waveguide body 110, with sides 114 and 112 is visualized as being "unfolded." In this visualization, each surface referenced with a prime indication (e.g., 112', 112" etc. or 114', 114", etc.) may refer to an instance of reflection from the corresponding physical surface 112 or 114.

When a light ray travels down the waveguide body along light path 142 or 144, for example, that light ray may intersect and be reflected from surfaces 112 and 114 multiple times. These intersections are depicted in FIG. 3 as points where the light ray crosses a corresponding prime indication of that surface (e.g., 112', 112" etc. or 114', 114", etc.).

Alternatively, the unfolded waveguide may be understood as a stack of multiple waveguides that interface with each other in an optically transparent manner, with each waveguide having the same thickness and optical properties as the physical waveguide body (e.g., waveguide body 110). For example, each waveguide of the stack corresponds to a respective transit of light across the waveguide between surfaces 112 and 114 due, for example, to an internal reflection or an injection of light.

Accordingly, FIG. 3 depicts a stack of seven waveguides that correspond to the seven transits of light depicted in FIG. 1 between light injected at 160 and positions 162/166 for light paths 142/144, respectively. At maximum, an angular bandwidth of a Bragg grating or other suitable volume hologram may be represented mathematically as: $0 < \frac{1}{2} \cdot m \cdot \cos(2 \cdot \sin^{-1}(1/n))$, where m is the number of bounces in the waveguide and n is the refractive index, assuming that the steepest ray is followed. In simplified form $d\emptyset = \frac{1}{2} \cdot m \cdot \cos 2\emptyset$, where m is the number of intersections with the active surface and $\emptyset$ is the critical angle. This demonstrates that $d\emptyset$ is a function of the number of reflections and the critical angle.

Light source 130 placed at the top left corner of FIG. 3, may take the form of projection engine or other suitable light source, for example. The light source, illuminates an area or region 310 at the bottom of the stack where example Bragg gratings 320 and 330 form part of light-interaction layer 120. For example, Bragg gratings 320 and 330 may be located at previously described positions 162 and 166 of FIG. 1, respectively.

A graphical image produced by light injected by light source 130 may be correctly reconstructed when all or a suitable portion of the light rays of that light source reach the bottom of the stack, and are extracted by the light-interaction layer for release from the waveguide. Note that it may be important, in at least some implementations, that light forming part of the image is not extracted at other points along the optical path so that, for example, the light ray following light path 144 is not affected by the portions of the optical waveguide that extracts the other light ray following light path 142, or vice-versa. Here, light traveling along light paths 142 and 144 are reflected by schematically-depicted Bragg gratings 320 and 330, respectively, and are released from waveguide 110 through opposing surface 112. For a given wavelength of injected light, Bragg gratings 320 and 330 may have different orientations (e.g., different angles relative to the light injection angle) and/or spacing relative to neighboring gratings to extract light having an angle of incidence within a different narrow range of incidence angles, such as light paths 142 and 144.

Figure 4:
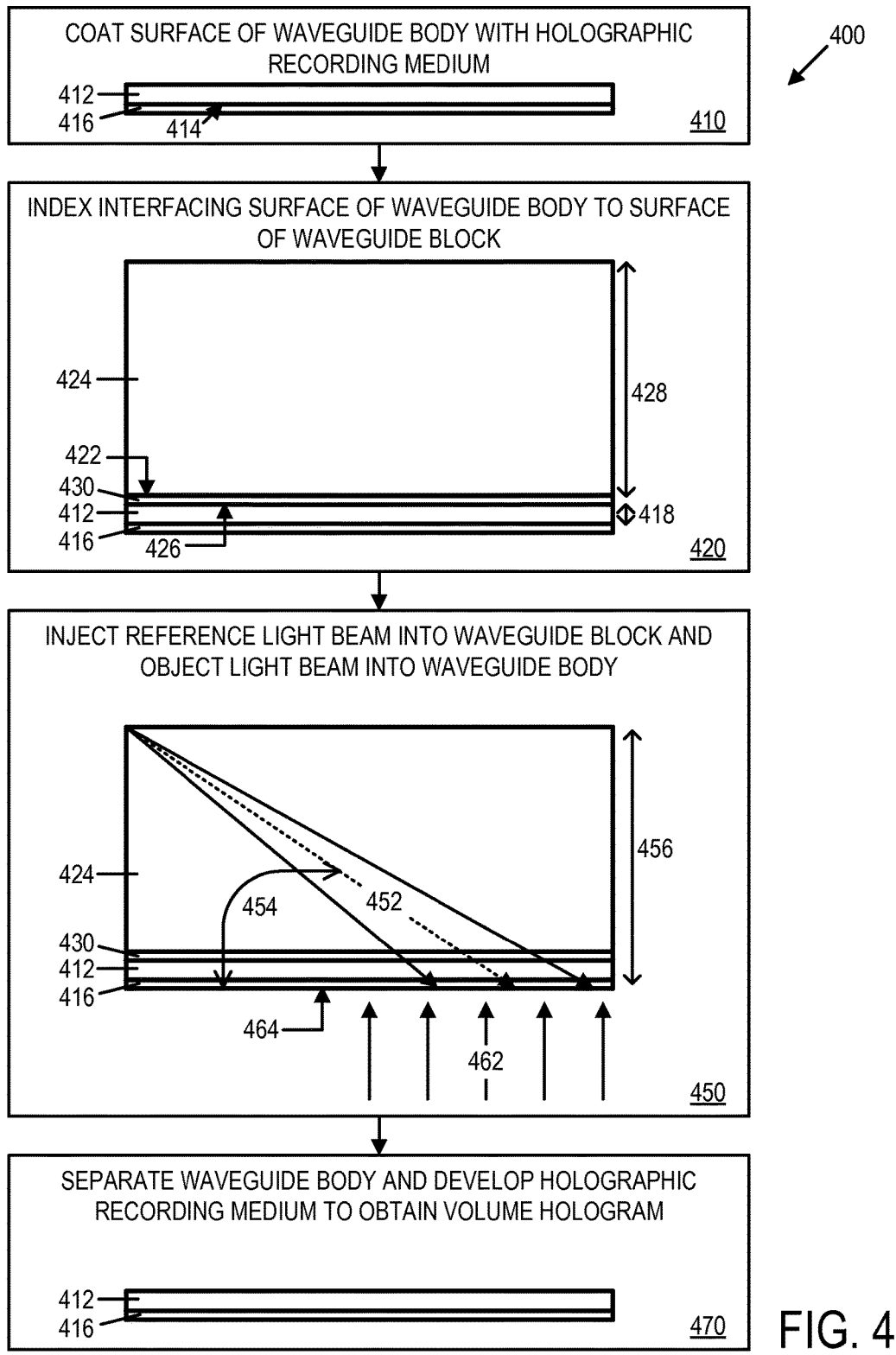
FIG. 4 is a flow diagram depicting an example method of manufacturing an optical waveguide.

FIG. 4 is a flow chart depicting an example method 400 of manufacturing an optical waveguide. As one example, the optical waveguide manufactured via method 400 may take the form of previously described optical waveguide 100 of FIG. 1, which includes an optically transparent waveguide body and a light-interaction layer that includes or contains a spatially-varying volume hologram.

At 410, a waveguide body 412 is prepared by coating a surface 414 of the waveguide body with a holographic recording medium to form a layer 416. A holographic recording medium may include a photopolymer, silver halide emulsion, or other suitable material that is capable of recording a volume hologram. A non-limiting example of a photopolymer includes the Bayer™ brand of photopolymer manufactured under the brand name Bayfol™ HX104. Within the context of FIG. 1, surface 414 coated by the holographic recording medium may correspond to surface 112 or surface 114 of previously described waveguide body 110, and layer 416 may correspond to layer 120.

At 420, method 400 includes indexing an interfacing surface of waveguide body 412 to a surface 422 of a waveguide block 424. The waveguide block may be formed from the same material or an optically similar material as the waveguide body. For example, waveguide block 424 may be formed from an optically transparent material with a same index of refraction as waveguide body 412. The interfacing surface of waveguide body 412 may be the surface coated with the holographic recording medium or an opposing surface of the waveguide body. In the example depicted in FIG. 4, the interfacing surface is the opposing surface 426 of waveguide body 412 that opposes the surface coated with the holographic recording medium.

In this example, the waveguide block has a thickness indicated by reference numeral 428 that is at least an integer multiple of a thickness 418 of the waveguide body as measured between the surface coated with the holographic recording medium and the opposing surface. As previously described with reference to the unfolded optical path of FIG. 3, each integer multiple of the thickness of the waveguide body represents a respective transit of light propagating within that waveguide body between opposing surfaces or interfaces of the waveguide.

Indexing the interfacing surface of the waveguide body to the surface of the waveguide block may include aligning one or more reference points, edges, faces, or surfaces of the waveguide body with one or more reference points, edges, faces, or surfaces of the waveguide block to permit subsequent alignment of one or more light sources or optical sensors with the resulting optical waveguide.

Indexing the interfacing surface of the waveguide body to the surface of the waveguide block may further include creating an optical path between the waveguide body and the waveguide block. As an example, the optical path may be created by directly mating or matching the interfacing surface of the waveguide body to the surface of the waveguide block. In another example, the interfacing surface may be indexed to the surface of the waveguide block via an intermediate layer 430.

Intermediate layer 430 may be used to conduct light between the waveguide block and the waveguide body in an optically transparent manner. The intermediate layer may also be used, in some examples, to temporarily bond the waveguide block to the waveguide body. The intermediate layer may take the form of a refractive index matching material. The material may have a solid or a liquid state. One suitable fluid-based material for intermediate layer 430 may include or consist of alcohol, for example. Another suitable material is glycerol, and a third is a surfactant known as TRITO X-100.

While waveguide block 424 is described as a solid block, a liquid block may alternatively be used. For example, the light guide may be inserted into a tank filled with a suitable index-matching liquid. The tank may be configured with black or otherwise light absorbing walls with windows at the entry points of the object and reference beams. Using this approach, the liquid that surrounds the waveguide in the tank serves as a liquid block that functions equivalently to a solid block.

At 450, method 400 includes injecting a reference light beam 452 having a diverging reference wave into the waveguide block and injecting an object light beam 462 into the waveguide body. Interference between the simultaneously injected reference light beam and the object light beam results in interference patterns that are recorded within the holographic recording medium of layer 416 that correspond to features of the resulting volume hologram, such as Bragg gratings, for example.

The reference light beam and object light beam may include light of the same target wavelength or wavelength range (and omit light outside of the target wavelength or wavelength range) to record a volume hologram that is excitable by incident light within the target wavelength or wavelength range. The volume hologram may be recorded using any suitable quantity of different target wavelengths or wavelength ranges using simultaneous or successive exposures of reference and object light beams from one or more light sources.

In one example, a light source may take the form of a laser. Any suitable wavelength of electromagnetic radiation may be used to record a volume hologram. A holographic recording medium optionally may be panchromatic, enabling the recording of volume holographs that are excitable over a wide range of wavelengths, such as UV, visible, IR, etc.).

The orientation of the reference light beam relative to the holographic recording medium of layer 416 corresponds to the orientation of a light source or optical sensor that is to be subsequently used with a volume hologram recorded within the holographic recording medium. The reference light beam and object light beam may, in at least some examples, originate from the same light source and may be separated from each other by a beam splitter. In other examples, a different light source may be used for the object light beam and the reference light beam.

As one example, the reference light beam is injected at a target angle 454 relative to the surface coated with the holographic recording medium of waveguide body 412 (or alternatively at a target angle relative to an axis orthogonal to the surface coated with the holographic recording medium). The reference light beam may be injected at a distance 428 from the interfacing surface of the waveguide body that is at least an integer multiple of the thickness of the waveguide body. Each integer multiple of the thickness of the waveguide body may correspond to another unfolded optical path for the waveguide body. The reference light beam may be injected at a distance 456 from surface 414 to which the holographic recording medium was applied. Distance 456 may be equal to the integer multiple of the thickness of the waveguide body. The integer multiple of the thickness of the waveguide body in combination with the waveguide body may be used to simulate a total unfolded optical path, such as previously described in FIG. 3. The reference light beam may have the same characteristics (e.g., wavelength, divergence, orientation, etc.) as injected light that is to be subsequently used in combination with the resulting optical waveguide obtained through method 300.

Object light beam 462 is injected into waveguide body 412 via a surface 464 of the waveguide body that opposes the interfacing surface. The region of the holographic recording medium of the waveguide body that is illuminated by object light beam 462 includes at least the region of that surface (e.g., between the most extremely diverging reference light rays) that is illuminated by reference light beam 462. The region of the holographic recording medium that is illuminated by the object light beam may be made larger than the region illuminated by the reference light beam to ensure that substantially all applicable portions of the holographic recording medium are exposed to interference patterns that result from interactions between the object and reference light beams.

In a first example, object light beam 462 includes collimated light waves injected into the waveguide body normal to a surface 464 that opposes the interfacing surface. Use of collimated light waves for the object light beam that are injected normal to surface 164 will result in the recording of a volume hologram that releases collimated light from the waveguide at an angle that is normal to the surface of the waveguide due to interaction between the object and reference light beams at or within the holographic recording medium.

In a second example, the object light beam includes non-collimated randomized light waves. Use of non-collimated randomized light waves for the object light beam will result in the recording of a volume hologram that, in combination with the waveguide body, forms both an outcoupler and diffuser of light injected along the same orientation as the reference light beam due to interaction between the object and reference light beams at or within the holographic recording medium. This recording technique may be used to produce an optical waveguide that provides a transparent display whereby an image is formed on the surface of the waveguide from which the light is released. In this example, the diffuser may take any suitable form, including a lens array, surface diffuser, volumetric diffuser, holographic diffuser, or diffractive optical element.

In a third example, the object light beam includes non-collimated diverging light waves. Use of non-collimated diverging light waves for the object light beam will result in the recording of a volume hologram that releases diverging light of the reference light's wavelength from the waveguide body due to interaction between the object and reference light beams at or within the holographic recording medium. Using this technique, the resulting optical waveguide behaves like a lens (e.g., a flat lens in the case of a flat waveguide body), which may be used as an imaging device to magnify objects in a manner similar to that of a magnifying glass. If the object wave is a non-collimated, diverging wave reflected or received from a real or reconstructed object, a hologram of that object is recorded in the holographic recording medium. The object may be replayed by injecting light into the waveguide that is released from the waveguide due to interaction with the hologram.

In a fourth example, the object light beam includes non-collimated converging light waves. Use of non-collimated converging light waves for the object light beam will result in the recording of a volume hologram that releases converging light of the reference light's wavelength from the waveguide body due to interaction between the object and reference light beams at or within the holographic recording medium.

In one or more of the above examples, the method at 450 may further include matching a wave divergence of the object light beam and a wave divergence of the reference light beam. If the object and reference wave divergence are matched, then the resulting volume hologram releases light from the waveguide that propagates outward into the surrounding environment, forming a projected image that may be focused on a surface located within that environment that is separate from the surface of the waveguide.

At 470, the waveguide body is separated from the waveguide block (and from the intermediate layer if present), and the surface coated with the holographic recording medium is developed and/or stabilized using a process suitable for that holographic recording medium to obtain a spatially-varying volume hologram layer. This spatially-varying volume hologram will have the same properties as the reference and object light beams, for example.

At the orientation depicted in FIG. 4, the spatially-varying volume hologram will increase, in a coordinate direction along the spatially-varying volume hologram, an angle of incidence by which light propagating in the waveguide body via total internal reflection is released from the waveguide body. This spatially-varying volume hologram may be configured, through application of a diverging reference wave, to continuously map an angle of injection of the light into the waveguide body to a position from which the light is released from the waveguide body. Therefore, this spatially-varying volume hologram may release light from a waveguide body in a manner that is similar to the release of light depicted in FIG. 1, for example.

If multiple reference beams are applied to the holographic recording medium at orientations that differ relative to each other, then the resulting spatially-varying volume hologram may accommodate multiple light sources and/or multiple optical sensors having the same orientations as the reference beams. These multiple light sources and/or multiple optical sensors may be utilized for specific target wavelengths or within specific target wavelength ranges, or across broader wavelength ranges.

FIG. 5 depicts an example optical system 500 that includes a light source 510 and an optical waveguide 520 having a relatively flat, planar shape. Optical waveguide 520 includes a waveguide body and a spatially-varying volume hologram 540 that interfaces with and covers at least a portion of the waveguide body. In this example, the spatially-varying volume hologram of optical waveguide 520 forms a layer on a rear face 522 of the waveguide body. As one example, optical waveguide 520 may take the form of previously described optical waveguide 100 of FIG. 1.

Light 530 injected into the waveguide body at surface 524 by light source 510 propagates via total internal reflection between a front face 526 and rear face 522 of the waveguide. Surface 524 may be located at an edge or corner of the waveguide, and may have an orientation that is normal to the angle of injection of light 530 from light source 510. An example light path 532 is depicted propagating along the optical waveguide before being redirected at 534 by the spatially-varying volume hologram and released from the waveguide body within a region 528 of front face 526.

In one example, optical system 500 may take the form of a display device, and region 528 may correspond to a display component (e.g., a display region) of the display device from which light is released. Light injected by at least light source 510 is mapped to a corresponding position within region 528 by the spatially-varying volume hologram. An image may be displayed on front face 526 within region 528, or an image may be projected from the optical waveguide through front face 526 and onto a surface within the surrounding environment, depending on recorded features of the volume hologram. In at least some examples, the optical geometry of the system may create keystone distortion in a displayed or projected image. Accordingly, keystone correction may be applied to the image prior to being injected into the waveguide.

Alternatively or additionally, optical system may take the form of an imaging device that captures an image based on light reflected from ambient objects captured by the optical system. Because the optical system has narrow optical bandwidth, the light is ideally from a secondary narrow band illumination source, such as a laser. Light source 510 may take the form of an optical sensor that captures internally reflected light from the environment received through front face 526 (e.g., via region 528). Region 528 may take the form of an imaging region that provides one or more optical sensors of the imaging device with a field of view. In this example, light may travel along example light path 532 in an opposite direction from the direction depicted in FIG. 5, where the light reflected from the environment may be received and detected by an optical sensor. In this configuration, light may be released from the waveguide body at or near a corner or edge of the waveguide body for reception by the optical sensor.

FIG. 6 depicts another example optical system 600 that includes a light source 610 and an optical waveguide 620. Optical waveguide 620 includes a waveguide body and a spatially-varying volume hologram 640 that interfaces with and covers at least a portion of the waveguide body. In this example, the spatially-varying volume hologram of optical waveguide 620 forms a layer on a front face 626 of the waveguide and light 630 is released through front face 626 as indicated by example light path 632.

FIG. 6 further depicts an example where light propagates via total internal reflection between a front face 626 and rear face 622 along a folded geometry as indicated by example light path 632 between a point or area of injection at surface 624 and a point of release through front face 626. In the folded geometry of FIG. 6, surface 628 may include or interface with an angled Bragg reflector or facetted Fresnel reflector, for example. Light 630 is injected at an angle that does not initially interact with the volume hologram, and is then converted to an angle that does interact with the volume hologram by a reflector located at position 634, for example.

FIG. 7 depicts another example optical system 700 that includes a light source 710 and an optical waveguide 720. Optical waveguide 720 includes a waveguide body and a spatially-varying volume hologram that interfaces with and covers at least a portion of the waveguide body. In this example, light 730 is injected through a face 722 that is located at a corner of the waveguide body. Face 722 may have an orientation that is normal to the angle of injection of light 730. Light 730 propagates outward from the corner in which face 722 is located via total internal reflection between front face 724 and rear face 726. The propagating light along light paths 732 and 734 interacts with the spatially-varying volume hologram and is released from the optical waveguide through front face 722 at different respective positions.

The disclosed optical waveguide that includes a spatially-varying volume hologram may be used in a variety of display devices and/or imaging devices that include thin, flat panel, transparent display regions or transparent image capture regions that may be used in a variety of device form-factors, including handheld devices, heads-up displays, and wearable glasses to name just a few examples. Imaging implementations of the disclosed optical waveguide may be used to detect motion within a field of view of an imaging region, which may be useful for providing a graphical display surface with touch-input functionality.

It will be understood that the subject matter of the present disclosure may be used with any suitable form of electromagnetic radiation including, but not limited to: visible light or portions of the visible light spectrum, ultraviolet, infrared, deep infrared, microwaves, etc. Accordingly, examples described herein with respect to light should not be limited to visible light wavelengths.

It will be understood that the configurations and/or approaches described herein are exemplary in nature, and that these specific embodiments or examples are not to be considered in a limiting sense, because numerous variations are possible. The methods described herein may represent one or more of any number of processing strategies. As such, various acts illustrated and/or described may be performed in the sequence illustrated and/or described, in other sequences, in parallel, or omitted. Likewise, the order of the above-described methods may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical waveguide, comprising:
a waveguide body configured to propagate a first light and a second light in a coordinate direction along the waveguide body via total internal reflection, the first light propagating at a first propagation angle within the waveguide body, and the second light propagating at a second propagation angle within the waveguide body, the second propagation angle being greater than the first propagation angle; and
a spatially-varying volume hologram that increases, along the coordinate direction, a release angle of incidence at which light will stop reflecting via total internal reflection and will be released from the waveguide body, such that the first light is released from the waveguide body at a first portion of the spatially-varying volume hologram, and the second light is released from the waveguide body at a second portion of the spatially-varying volume hologram, the second portion being further along the coordinate direction than the first portion.

2. The optical waveguide of claim 1, wherein the waveguide body is a display component and the coordinate direction is a direction of light propagation within the waveguide body for light injected into an edge or corner of the waveguide body by a light source.

3. The optical waveguide of claim 1, wherein the spatially-varying volume hologram continuously maps an angle of injection of light into the waveguide body to a position from which the light is released from the waveguide body.

4. The optical waveguide of claim 1, wherein the waveguide body has a front face and a rear face parallel to and opposing the front face.

5. The optical waveguide of claim 4, wherein the spatially-varying volume hologram is a layer on the rear face and the light is released through the front face.

6. The optical waveguide of claim 4, wherein the spatially-varying volume hologram is a layer on the front face and the light is released through the front face.

7. The optical waveguide of claim 4, wherein the spatially-varying volume hologram is embedded in the optical waveguide and the light is released through the front face.

8. The optical waveguide of claim 4, wherein the front face is substantially planar and the rear face is substantially planar.

9. The optical waveguide of claim 1, wherein the waveguide body is an imaging component and the coordinate direction is opposite a direction of light propagation within the waveguide body for internally reflected ambient light received through a face of the waveguide body.

10. An optical system, comprising:
   a light source;
   a waveguide body that propagates a first light and a second light injected into the waveguide body by the light source via total internal reflection between a front face and a rear face parallel to and opposing the front face along a direction of propagation within the waveguide body, the first light propagating at a first propagation angle within the waveguide body, and the second light propagating at a second propagation angle within the waveguide body, the second propagation angle being greater than the first propagation angle; and
   a spatially-varying volume hologram forming a layer on the rear face or the front face that increases, in the direction of propagation, a release angle of incidence at which light will stop reflecting via total internal reflection and will be released from the waveguide body such that the first light is released from the waveguide body at a first portion of the spatially-varying volume hologram, and the second light is released from the waveguide body at a second portion of the spatially-varying volume hologram, the second portion being further along the coordinate direction than the first portion, and the spatially-varying volume hologram continuously maps an angle of injection of the light into the waveguide body to a position from which the light is released from the waveguide body through the front face.

11. The optical system of claim 10, further comprising:
   an optical sensor located near an edge or corner of the waveguide body to capture internally reflected ambient light received through the front face of the waveguide body;
   wherein the spatially-varying volume hologram continuously maps an angle of release of light from the edge or corner of the waveguide body into the optical sensor to a position at which the ambient light is received through the front face of the waveguide body.

* * * * *